April 17, 1962

J. M. CHILTON 3,030,569

SELF BALANCING POTENTIOMETER SYSTEM FOR USE IN
ASSOCIATION WITH WEIGHING APPARATUS

Filed Nov. 21, 1957

INVENTOR
John M. Chilton

Jones & Bateman
ATTORNEYS

INVENTOR
John M. Chilton
Norris & Bateman
ATTORNEYS

United States Patent Office 3,030,569
Patented Apr. 17, 1962

3,030,569
SELF BALANCING POTENTIOMETER SYSTEM FOR USE IN ASSOCIATION WITH WEIGHING APPARATUS
John Moorhouse Chilton, Edgbaston, Birmingham, England, assignor to W. & T. Avery Limited, a British company
Filed Nov. 21, 1957, Ser. No. 697,926
10 Claims. (Cl. 323—75)

This invention relates to a self balancing potentiometer system for use in association with weighing apparatus and has for its primary object to provide means whereby the indication of the weighing apparatus may be utilised to provide a local or remote digital indication which may be employed for example for the operation of an electric solenoid operated typewriter, an accounting machine or a ticket printer. Further objects of the invention will be apparent from the embodiments hereinafter described.

The invention consists of a self balancing potentiometer system associated with weighing means for providing a digital representation corresponding to the magnitude of a weighment, comprising variable impedance means controlled by the weighing means, said variable impedance means being incorporated in a bridge circuit embodying a multi-stage potentiometer, a phase conscious circuit which is responsive to a signal derived from an unbalanced condition of the bridge circuit, contact means controlled by the phase conscious circuit and thus responsive to a phase reversal of the signal derived from the bridge circuit when the multi-stage potentiometer is adjusted through its bridge balancing setting, stepping relay means under the control of the said contact means for effecting an automatic setting of the stages of said potentiometer to balance the bridge circuit to accord with the magnitude of the weighment.

Means for carrying the present invention into practice will now be described with reference to the accompanying drawings, in which.

Figure 1:
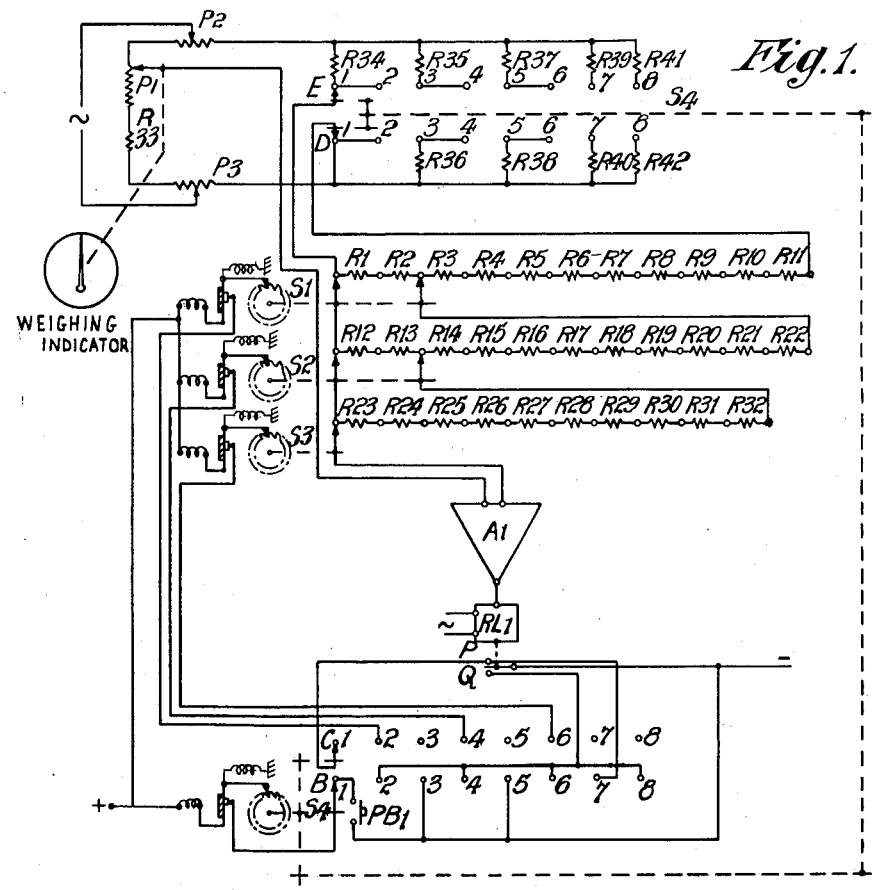
FIGURE 1 illustrates a circuit comprising a self balancing potentiometer according to the invention coupled to the indicator of a weighing apparatus.

Referring to the circuit seen in FIGURE 1 the spindle carrying the indicator of the weighing apparatus is mechanically coupled to the moving contact of a precision potentiometer P1 included in a Wheatstone bridge also comprising the potentiometers P2, P3 and a Kelvin-Varley type multi-stage potentiometer R1–R32. The bridge circuit also includes the resistances R33 and R34–R42 the purpose whereof will be hereinafter described. The moving contacts of the potentiometers P2 and P3 are connected to an A.C. supply and are adjusted so that the bridge circuit is balanced with the weight indicator registering ½ division and the Kelvin-Varley potentiometer set at zero, and also with the weight indicator at its maximum reading say 998½ units and the Kelvin-Varley potentiometer adjusted to 998 divisions, the half division discrepancy being used so that the Kelvin-Varley potentiometer indicates the nearest division of the weight indicator.

The Kelvin-Varley potentiometer is of conventional form and consists of a plurality of resistance stages or arms each made up of a number of resistance elements of equal value, and wherein a pair of moving contacts associated with one stage, which moving contacts are always separated by two resistance elements, are connected across the whole of the series of resistances in the next lower stage. The value of the resistances in each stage is such that the total resistance of each stage is equal to twice the resistance of each resistance element in the next higher stage. For example, in the case of a three decade system illustrated in FIGURE 1 of the drawings, the highest and second stages R1 to R11 and R12 to R22 respectively each consist of eleven resistance elements whereas the lowest stage consists of ten resistance elements R23 to R32. In the second stage the total resistance of the series R12 to R22 is equal to twice the resistance of any one of the resistance elements R1 to R11 in the highest stage, whereas in the lowest stage the total resistance of the series R23 to R32 is equal to twice the resistance of any one of the resistance elements R12 to R22.

In operation it will be appreciated that the pair of resistance elements spanned by the moving contacts in a higher stage is shunted by an equal resistance of equal value made up of the effective resistance of the next lower stage and any still lower stages in shunt therewith. If, for example, 100 volts are applied across the highest stage, then this will be divided into ten increments each of 10 volts, one of which increments is present across the pair of resistances spanned by the two moving contacts associated with that stage. In the second stage the 10 volts which are applied across this stage are divided into ten increments each of one volt, and in the third or lowest stage the 1 volt applied across this stage is divided into ten increments each of 1/10 volt. Thus, any setting of the three stages of the Kelvin-Varley potentiometer provides three orders of voltage which can be arranged to be indicative of any number between 0 and 999.

Although the above described Kelvin-Varley potentiometer provides for a voltage indicative of a three decade number system, the potentiometer may be readily designed to suit any denomination of units. For example, where the potentiometer is used in conjunction with apparatus weighing up to 7 tons by 14 lbs. increments, the highest potentiometer stage would have 8 steps or resistance elements instead of 11 as previously described, the second stage would have 21 steps instead of 11, and the lowest stage would have 8 steps instead of 10. Thus the highest stage would furnish a voltage indicative of up to 7 tons, the second stage would provide a voltage indicative of cwts. and the lowest stage a voltage indicative of 14 lb. intervals. In a similar manner any denomination of weights can be covered or a binary coded output can be provided.

The Kelvin-Varley potentiometer in the example illustrated consists of three decade stages wherein the pair of moving contacts in each decade are driven by a stepping relay S1, S2 and S3 which are adapted to traverse their respective moving contacts so long as their driving coils are energized from the current supply. The output voltage derived from between the moving contact of the potentiometer P1 and the Kelvin-Varley potentiometer network is fed to a phase-conscious amplifier circuit A1 which controls a relay RL1 such that a phase reversal of the input signal to the said circuit results in the actuation of the relay. The relay RL1 incorporates a moving contact which is co-operative with a pair of alternative fixed contacts P and Q. It will be appreciated that as the Kelvin-Varley potentiometer is adjusted from its underbalancing condition to its over-balancing condition the output of the phase-conscious stage will suffer a 180 degree phase reversal which results in the actuation of the relay RL1 so that its moving contact is operated to engage the alternative contact P or Q.

Figure 5:
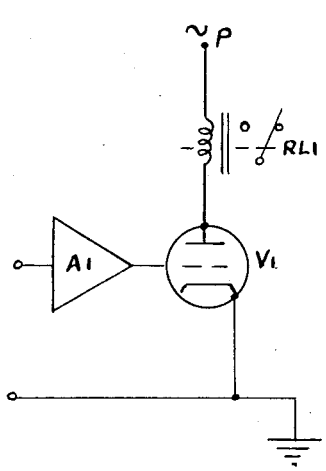
FIGURE 5 illustrates one form of phase-conscious circuit for incorporation in the circuit seen in FIGURE 1.
Figure 6:
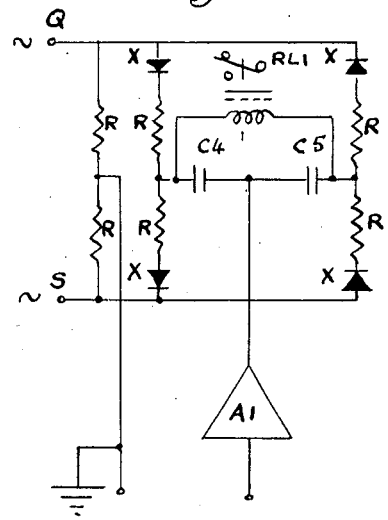
FIGURE 6 shows an alternative form of phase-conscious circuit to that seen in FIGURE 5, and FIGURE 7 diagrammatically illustrates the mode of connection of the circuit seen in FIGURE 3 into that illustrated in FIGURE 1.

Various known forms of phase-conscious circuits for the control of the relay RL1 may be employed for the above purpose, and two examples of such phase-conscious circuits are represented in FIGURES 5 and 6 of the accompanying drawings.

FIGURE 5 illustrates a phase-conscious circuit of the type wherein the phase discrimination takes place in the output stage of the amplifier embodying a normal non-polarised electro-magnetic relay. In this arrangement an A.C. reference supply is fed at P in series with the relay in the anode circuit of a triode valve V1. The valve grid is fed with the signal from a previous amplifier stage A which signal will be approximately in phase or 180 degrees out-of-phase with the anode reference voltage according to the bridge conditions, and will increase or reduce the anode current accordingly and hence operate the relay RL1 as required. This circuit may be modified to include two valves in push pull, thyratron valves, or multi-electrode valves may be used and the signal fed to one or more grids and the supply reference voltage fed either to the anode or to one or more grids.

Alternatively a standard type of amplifier A may be employed with a demodulator circuit which changes the phase reversal into a change of D.C. polarity, followed by a polarised relay RL1. Such a circuit is represented in FIGURE 6 wherein the demodulator circuit includes a rectifier ring of known form. In FIGURE 6 the various resistors R are of equal value and the charge which is present in the capacitors C4 and C5 will depend on the amplitude of the signal and its phase relationship with respect to the supply or reference voltages applied at the points Q and S. The polarised relay RL1 may be connected directly across the terminals of C4 and C5 as shown, or via a D.C. amplifier. The polarised relay may embody an electro-magnetic or permanent magnet polarising field or alternatively a non-polarised relay may be used in conjunction with a shunt or series rectifying element.

As an alternative to the above described arrangements the expert will appreciate that the whole system may be operated on a D.C. basis employing D.C. bridge excitation, a D.C. amplifier and a polarised relay.

The operation of the stepping relays S1, S2 and S3 is controlled by a further stepping relay S4 incorporating four banks of contacts B, C, D and E and adapted to traverse a moving contact associated with each bank so long as the driving coil of the switch is energized from the current supply. The moving contact of the bank B is connected through the energising coil of the relay S4 to the positive terminal of a D.C. power supply the negative terminal whereof is connected both to the moving contact of the relay RL1 and to the 1st, 3rd and 5th contacts of the contact bank B. The moving contact of the bank C is connected to one of the fixed contacts (P) of the relay RL1, the alternative fixed relay contact (Q) being connected to the 2nd, 4th, 6th and 8th contacts of the bank B. The 2nd, 4th and 6th contacts of the bank C are connected to the energising coils of the stepping relays S1, S2 and S3 respectively. It will be appreciated that when the operation of the governing stepping relay S4 is initiated, by means of for example a push button switch PB1 in the connection of the power supply to the first terminal of the bank B, then the moving contact B moves to the 2nd contact of this bank; simultaneously the moving contact of the bank C is traversed to the 2nd contact of its bank and assuming that the contact P of the relay RL1 is engaged, the stepping relay S1 is thereby energised so that its associated pair of stepping contacts of the hundreds decade R1–R11 of the Kelvin-Varley potentiometer are traversed until the bridge circuit passes through and past its balanced condition whereby the output of the phase-conscious stage is reversed in phase, thus to result in the engagement of the alternative contacts Q of the relay RL1.

Since it is necessary that the Kelvin-Varley potentiometer be adjusted to its over-balanced condition in order that a phase reversal may be obtained to effect the operation of the contacts P and Q it will be appreciated that the Kelvin-Varley potentiometer must be subsequently reset to its under-balanced condition in order that a balance position may obtain in the lower decades. If for example the potentiometer P1 is set to say 560 units corresponding to the indication of the weighing indicator then the first decade of the Kelvin-Varley potentiometer must be first set to 600 units i.e. over-balanced to result in the operation of the relay RL1 and must then be reset to 500 units to admit of the second decade being set at 560. This operation of the circuit is achieved by means of the resistances R34–R38 which are connected as shown to the contacts of the third and fourth banks D and E of the stepping relay S4. The resistance R34 is equal to one unit increment in the highest order balancing stage S1 of the Kelvin-Varley potentiometer, which in the case of a three decade system will equal 100 units. The resistance R34 is arranged to be connected by the governing stepping switch S4 between the low end of the scale potentiometer P1 and through the first and second contacts of the contact bank E to the low end of the Kelvin-Varley network so that the balance point in the Kelvin-Varley network is effectively biased by 100 units with the result that in the above example, when the Kelvin-Varley potentiometer is set at 500 units then the Kelvin-Varley potentiometer together with the resistance R34 produces 600 units of voltage thereby to overbalance the 560 units of voltage produced by the scale potentiometer P1 and so produce by means of the amplifier A1 and the relay RL1 an operation of the switch means PQ. In order that the introduction of the resistance R34 shall not upset the equality of the ranges of the scale potentiometer P1 and the Kelvin-Varley potentiometer, a resistance R33 equal in value to the resistance R34 is connected to the high end of the scale potentiometer P1.

In order to produce a shift of the balance point in the second order balancing stage S2 of the Kelvin-Varley potentiometer by an amount equal to one unit increment in that stage so as to permit the balancing of the next lower order stage S3 the third and fourth contacts of the banks C and D serve to connect the resistances R35 and R36 to the low and high ends respectively of the Kelvin-Varley potentiometer. The resistances R35 and R36 respectively correspond with 10 units and 90 units so as to produce a bias of 10 units in the tens decade S2 of the Kelvin-Varley potentiometer. Thus when the tens decade of the Kelvin-Varley potentiometer reaches 60 units the Kelvin-Varley potentiometer together with the resistances R35 and R36 produce 70 units of counter voltage which overbalances the 60 units produced by the scale potentiometer P1 so as to secure an operation of the switch means PQ under the control of the relay RL1.

In a similar manner to that above described the resistances R37 and R38 corresponding to 1 unit and 99 units respectively are connected to the 5th and 6th contacts of the banks D and E so as to produce 1 unit bias or shift of the balance point in the lowest order decade S3 of the Kelvin-Varley potentiometer.

Subsequent to the operation of the stepping relay S1 of the hundreds decade and the resultant operation of the relay RL1 to engage the contact Q the 2nd contact of bank B is connected to the negative terminal of the D.C. supply whereby the moving contacts B, C, D and E are progressed to the 3rd contacts of their banks. At this position the resistance R34 has been disconnected and the pair of resistances R35 and R36 are introduced into the circuit so that the bridge passes from an over-balanced to an under-balanced condition to result in a phase reversal and the consequent operation of the relay RL1 to thereby engage the contact P. Since the contact B is connected to the negative terminal of the D.C. supply the moving contacts B, C, D and E are further traversed to engage the 4th contacts whereupon contact C4 is connected to the negative terminal of the D.C. supply to result in the stepping relay S2 being energised to effect the setting of the tens decade R12–R22. Subsequent to the adjustment of the tens decade from an under-balanced to an over-balanced position the consequent phase reversal results in the engagement of contact Q. In a similar manner to that previously described contacts B5 and B6 are sequentially engaged to effect the setting of the units decade R23–R32. The stepping relays S1, S2 and S3 are thus automatically set in accordance with the indication of the weighing apparatus and this setting may be used to provide a corresponding digital representation.

It will be appreciated that the above described arrangement ensures that the output from the potentiometer P1 is balanced to the nearest unit of 1 in 999 units irrespective of the gain of the amplifier and the sensitivity of the phase sensitive relay RL1 provided that the overall sensitivity is such that a signal of 0.1 units or less will operate the relay RL1 in order that the arrangement is sensitive to a change between .4 and .5 units.

It is desirable that apparatus of the aforesaid kind should incorporate means such that an incorrect reading cannot be obtained without the fault being known to the user of the equipment. As seen in FIGURE 1 the contact banks B, C, D and E, of the governing stepping relay S4 are provided with 7th and 8th contacts which are arranged to introduce pairs of resistances R39 and R40, and R41 and R42 respectively into the network. These resistances act in a similar manner to that of the biasing resistors R34 to R38 so as to successively underbalance and overbalance the bridge circuit by one unit increment in the lowest order balancing stage so that if the system is correctly functioning there will be provided two successive operations of the relay RL1 and switch means PQ. At the 7th and 8th contacts of the bank B of the governing stepping switch S4 the driving coil of the switch S4 is successively connected to opposite contacts P and Q of the said switch means in such manner that the driving coil of the switch S4 will be energized at the 7th and 8th contacts so as to complete its cycle of operation only if the requisite changeover has taken place in the switch means PQ as a result of the introduction of the resistors R39 to R42. Thus the arrangement ensures that the stepping switch S4 cannot complete its cycle unless the network is correctly balanced to the nearest unit and the amplifier has the minimum sensitivity required. The failure of the relay to complete its cycle may be employed in any convenient manner to prevent the printing or other subsequent operations or to provide an audible or visual alarm.

Figure 2:
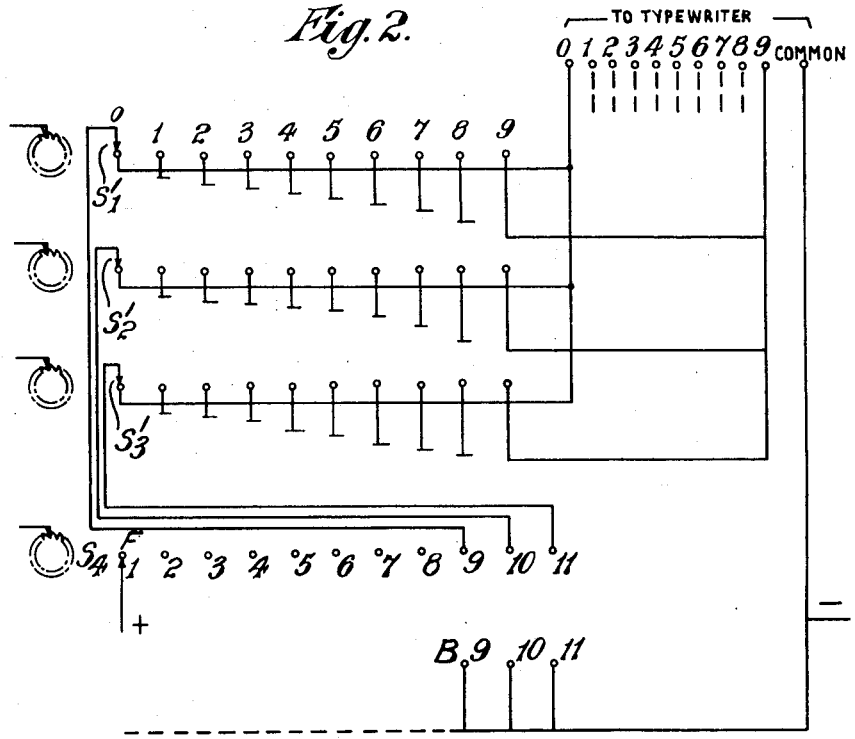
FIGURE 2 illustrates diagrammatically the adaptation of the self balancing potentiometer seen in FIGURE 1 for the operation of an electric typewriter.

Referring to FIGURE 2 of the drawings an example is shown whereby the setting of the stages of the Kelvin-Varley potentiometer in accordance with a weighment can be utilized to operate a solenoid operated typewriter to print a corresponding digital record.

In the example shown each decade stage relay S1, S2 and S3 of the Kelvin-Varley potentiometer has associated therewith an auxiliary bank of contacts S1', S2', and S3' respectively, the individual contacts whereof are connected to the terminals of the corresponding solenoids of the typewriter. Further the governing stepping relay S4 is provided with an additional contact bank F which embodies three contacts 9, 10 and 11 in addition to the eight contacts of the previously described contact banks B, C, D and E; also the contact bank B which controls the energisation of the relay S4 is provided with an additional three contacts B9, B10 and B11 which are connected to the negative terminal of the D.C. supply so that subsequent to the contacts B1 to B8 being traversed, the contacts B9 to B11 effect the further operation of the relay S4. The moving contact of the additional contact bank F, which moving contact is connected to the positive supply terminal, traverses the contacts F9 to F11 thus to sequentially energise the moving contacts of the contact banks S1', S2' and S3'. By this arrangement the typewriter solenoids which correspond to the contacts of the additional contact banks S1', S2' and S3' are sequentially energised in accordance with the setting of the moving contacts of the contact banks S1', S2' and S3' and thus in accordance with the automatic setting of the Kelvin-Varley potentiometer to accord with the magnitude of the weighment being recorded. Thus a record of the weighment can be automatically provided.

It will be appreciated that although the above described apparatus provides for sub-division into 999 units in three decades the system may however be readily adapted to suit any denominations of units. For example in the case of apparatus weighing up to 7 tons by 14 lbs. divisions, the stage S1 would have 8 steps instead of 11, stage S2 would have 21 steps instead of 11, and stage S3 would have 8 steps instead of 10. Thus stage S1 would correspond directly to tons, S2 to hundredweights and S3 to 14 lb. intervals. Where a remote electric signal is required three auxiliary banks would be then required on the stepping relay S3 to accommodate the requisite digits, and two auxiliary banks on the stepping relay S2 to accommodate the two digits. In a similar manner any denominations of weights can be covered or a binary coded output can be provided.

Figure 3:
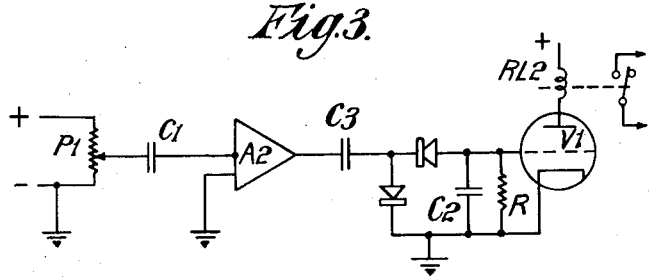
FIGURE 3 is a circuit of an anti-fraud device for incorporation in the circuit of FIGURE 1.

Referring to FIGURE 3 of the drawings the circuit of an antifraud device suitable for incorporation in the above described circuit is illustrated. It will be appreciated that the illustrated circuit is only one example of means whereby the oscillation of the weighing mechanism is utilised to provide an A.C. signal for the purpose of locking the aforesaid apparatus until the weighing mechanism becomes stationary. The potentiometer P1 coupled to the indicating spindle of the weighing apparatus is here connected to a source of D.C. current, which may conveniently be derived from the power amplifier supply. The moving contact of the potentiometer is connected through a condenser C1 to the input of an amplifier A2 the output whereof is connected through a further condenser C3 to a voltage doubling circuit embodying a condenser C2 and a parallel resistance R in the grid circuit of a triode valve V1. The anode circuit of the valve includes the energising coil of a relay RL2 the contacts whereof are adapted to bring into operation the self balancing potentiometer circuit hereinbefore described. In the operation of the anti-fraud device any movement of the indicating spindle will provide an A.C. modulation of the output of the potentiometer P1 which modulation is transmitted via the D.C. blocking condenser C1 to the amplifier whereby the condenser C2 is charged and the valve is thereby cut off. When the indicator spindle becomes stationary the condenser C2 discharges at a rate dependent upon the time constant of the circuit whereby after a suitable time interval the valve conducts and the relay is energised to couple the self balancing potentiometer circuit.

Figure 7:
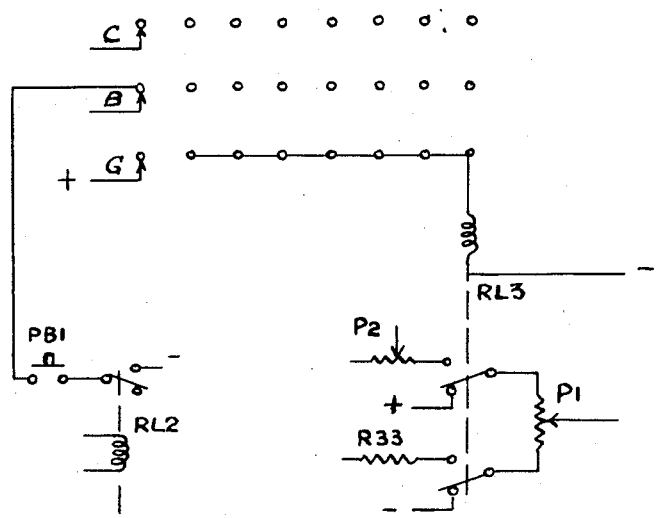

The mode of connection of the circuit seen in FIGURE 3 in the circuit illustrated in FIGURE 1 will be appreciated from an examination of FIGURE 7 wherein it will be seen that the contacts of the relay RL2 of FIGURE 3 are connected in series with the control switch PB1 of FIGURE 1 and an additional contact bank G is incorporated in the stepping relay S4 in order to effect the connection and disconnection of the remainder of the circuit seen in FIGURE 3 through the agency of a further relay RL3 which will be actuated by the operation of the relay RL2 consequent upon the potentiometer P1 reaching a static condition.

Figure 4:
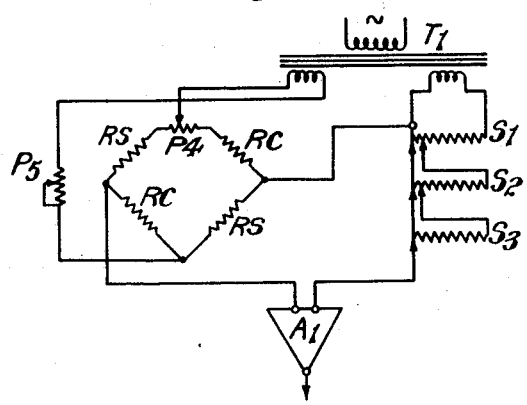
FIGURE 4 illustrates diagrammatically the application of the present invention to a load cell weighing apparatus.

Referring to FIGURE 4 of the drawings the application of the self balancing potentiometer system hereinbefore described to a strain gauge network of the type commonly used in load cell weighing systems is diagrammatically illustrated. In the illustrated example the strain gauge network is arranged in the form of a bridge consisting a pair of mechanically strained resistances RS which are stressed by the load to be measured, a pair of temperature compensating resistances RC, a zero balancing potentiometer P4 and a sensitivity control P5. The strain gauge bridge and the self balancing potentiometer are fed from a pair of secondary windings of a transformer T1 and the outputs from the two networks are fed to the amplifier A1 incorporating a phase-conscious output stage, the remainder of the circuit controlling the stepping relays S1, S2 and S3 being similar to that shown in FIGURE 1. The resultant setting of these stepping relays can be utilised to provide a local or remote digital representation in accordance with the stress applied to the strained gauges RS.

I claim:

1. In an apparatus of the class described, a bridge circuit including means for producing a voltage proportional to the departure of a condition from a set point wherein said condition is measurable in digits, and a network having a plurality of balancing stages producing counter voltage increments in a plurality of orders corresponding respectively with different units of the departure of said condition from said set point; amplifier means having an input connected to the output of the bridge circuit; switch means under the control of said amplifier means and responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced to thereby overbalance the bridge when the stepping switch identified with that stage provides a number of voltage increments corresponding to the appropriate number of weight units in that order; voltage productive means; means operable by said governing stepping switch for automatically introducing said voltage productive means into said bridge circuit after the completion of the balancing of said stages, said voltage productive means being operable upon introduction into said bridge circuit to successively unbalance said circuit in opposite senses to render said switch means operative to actuate said governing stepping switch.

2. The apparatus according to claim 1, wherein said voltage productive means comprises two pairs of resistances.

3. In an apparatus of the class described, a bridge circuit including means for producing a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means consisting of a relay operated contact having alternate engagement with a pair of fixed contacts under the control of said amplifier means and being responsive to a change from an underbalanced to an overbalanced condition of the bridge; a governing stepping switch under the control of said switch means and connected in circuit relationship with said fixed contacts; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced to thereby overbalance the bridge when the stepping switch identified with that stage provides a number of voltage increments corresponding to the appropriate number of weight units in that order.

4. In an apparatus of the class described, a bridge circuit including means for producing a voltage proportional to the departure of a condition from a set point wherein said condition is measurable in digits and a network including a multi-stage Kelvin-Varley type potentiometer having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced, thereby to overbalance the bridge when the stepping switch identified with that stage provides a number of voltage increments corresponding to the appropriate number of weight units in that order.

5. In a weighing apparatus of the class described having a weight indicative spindle, a bridge circuit including a potentiometer having a movable contact connected to said spindle and operable to produce a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced to thereby overbalance the bridge when the stepping switch identified with that stage provides a number of voltage increments corresponding to the appropriate number of weight units in that order.

6. In an apparatus of the class described, a bridge circuit having means including resistance strain gauges for producing a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced, thereby to overbalance the bridge when the stepping switch identified with that stage provides a number of voltage increments corresponding to the appropriate number of weight units in that order.

7. In an apparatus of the class described, a bridge circuit including means for producing a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a pluraltiy of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced to thereby overbalance the bridge when the stepping switch identified with that stage provides a number of voltage increments corresponding to the appropriate number of weight units in that order; a digital recording apparatus; contact banks on the stepping switches associated with the several balancing stages, means connecting said contact banks to said digital recording apparatus to thereby provide a digital record in accordance with the setting of said stages.

8. The combination of a weighing apparatus with a system comprising a bridge circuit including means for producing a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced, thereby to overbalance the bridge when the stepping switch identified with that stage provides a number of voltage increments corresponding to the appropriate number of weight units in that order; and locking means for preventing operation of the system until a static condition of the weighing apparatus is obtained.

9. The apparatus according to claim 8, wherein said locking means comprises means sensitive to an A.C. modulation of the load proportionate D.C. voltage arising from movement in the weighing mechanism.

10. In an apparatus of the class described, a bridge circuit including means for producing a voltage proportional to the departure of a condition from a set point wherein said condition is measurable in digits and a network having a plurality of balancing stages producing counter voltage increments in a plurality of orders corresponding respectively with different units of the departure of said condition from said set point; amplifier means having an input connected to the output of the bridge circuit; switch means under the control of said amplifier means responsive to a change from an underbalanced to an overbalanced condition of the bridge; a governing stepping switch under the control of said switch means; a plurality of stepping switches under the control of the governing stepping switch and said switch means, said plurality of stepping switches being identified one with each counter voltage producing balancing stage and adapted to establish the counter balancing voltages produced in said stages; and biasing resistance means introduced by said governing stepping switch into the bridge circuit separately of said network to increase the counter voltage during the setting of each counter voltage producing stage of balancing by an amount equal to one increment of that stage being balanced to thereby overbalance the bridge when the stepping switch identified with that stage provides a number of voltage increments corresponding to the appropriate number of weight units in that order; first and second biasing resistance means; means operable by said governing stepping switch for automatically successively introducing said first and second biasing resistance means into said bridge circuit after the completion of the balancing of said stages, said first and second biasing resistance means being operable to successively underbalance and overbalance said bridge circuit corresponding to one unit increment in the lowest order balancing stage to thereby provide for two successive and corresponding operations of said switch means for assuring the completion of the operating cycle of said governing switch.

References Cited in the file of this patent

UNITED STATES PATENTS

| | | |
|---|---|---|
| 1,629,221 | MacNutt | May 17, 1927 |
| 2,101,452 | Rauch | Dec. 7, 1937 |
| 2,141,236 | Benedict | Dec. 27, 1938 |
| 2,376,234 | De Castro | May 15, 1945 |
| 2,686,634 | Kolisch | Aug. 17, 1954 |
| 2,733,911 | Thurston | Feb. 7, 1956 |
| 2,790,549 | Bize | Apr. 30, 1957 |
| 2,819,054 | Thorsson | Jan. 7, 1958 |
| 2,882,035 | Lauler | Apr. 14, 1959 |
| 2,932,784 | Hampton | Apr. 12, 1960 |
| 2,951,200 | Critchlow | Aug. 30, 1960 |